(12) United States Patent
Lightstone et al.

(10) Patent No.: US 8,942,251 B2
(45) Date of Patent: Jan. 27, 2015

(54) SHARED CELL RECEIVER FOR UPLINK CAPACITY IMPROVEMENT IN WIRELESS COMMUNICATION NETWORKS

(75) Inventors: Leonard Lightstone, Ottawa (CA); Gary David Boudreau, Kanata (CA); Edward Mah, Kanata (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 167 days.

(21) Appl. No.: 13/473,956

(22) Filed: May 17, 2012

(65) Prior Publication Data
US 2013/0308469 A1 Nov. 21, 2013

(51) Int. Cl.
H04L 12/28 (2006.01)
H04W 72/12 (2009.01)

(52) U.S. Cl.
CPC .................................. *H04W 72/1226* (2013.01)
USPC ......................................................... 370/431

(58) Field of Classification Search
USPC .......................... 370/252, 310–349, 431–463
See application file for complete search history.

(56) References Cited

U.S. PATENT DOCUMENTS

| 2009/0233646 A1 | 9/2009 | Cyzs et al. |
| 2010/0067435 A1 | 3/2010 | Balachandran et al. |
| 2012/0057535 A1* | 3/2012 | Zhang et al. ................... 370/329 |
| 2012/0099512 A1* | 4/2012 | Yamazaki ..................... 370/312 |
| 2012/0294162 A1* | 11/2012 | Pajukoski et al. ............. 370/252 |
| 2013/0028180 A1* | 1/2013 | Gao et al. ...................... 370/328 |

OTHER PUBLICATIONS

Panasonic: "Discussion on the Selection of Reception Points for UL CoMP", 3GPP DRAFT: R1-113128, Selection of RPS for UL Comp, 3rd Generation Partnership Project (3GPP), Mobile Competence Centre; 650, Route des Lucioles; F-06921 Sophia-Antipolis Cedex; France, vol. RAN WG1, No. Zhuhai; 20111010, Oct. 4, 2011, XP050538266, [retrieved on Oct. 4, 2011] sections 1, 2.3 consisting of 3-pages.

Intel Corporation: "UL CoMP Control and Signaling Principles", 3GPP DRAFT; R1-121525, 3rd Generation Partnership Project (3GPP), Mobile Competence Centre, 650, Route des Lucioles; F-06921 Sophia-Antipolis Cedex; France, vol. RAN WG1, No. Jeju, Korea; 20120326-20120330, Mar. 20, 2012, XP050599798, [retrieved on Mar. 20, 2012] sections 2,3 consisting of 5-pages.

(Continued)

*Primary Examiner* — Candal Elpenord
*Assistant Examiner* — Juvena Loo
(74) *Attorney, Agent, or Firm* — Christopher & Weisberg, P.A.

(57) ABSTRACT

A wireless communication method and system are provided in which an uplink data stream that has uplink data associated with a user device is received. Channel performance data based at least in part on a portion of the uplink data stream is determined. A determination is made whether the channel performance data meets a predetermined performance level. The portion of the uplink data stream is discarded when the channel performance data does not meet the predetermined performance level. The portion of the uplink data stream is tagged for additional processing when the channel performance data meets the predetermined performance level.

20 Claims, 7 Drawing Sheets

(56) References Cited

OTHER PUBLICATIONS

Ericsson (Rapporteur): "TP on UL Interference Solutions for Carrier Based HetNet", 3GPP DRAFT; R3-120806 UL_Interference_Hetnet, 3rd Generation Partnership Project (3GPP), Mobile Competence Centre; 650 Route des Lucioles; F-06921 Sophia-Antipolis Cedex; France, vol. RAN WG3, No. Carbo, 20120326-20120330, Mar. 30, 2012, XP050610899, [retrieved on Mar. 30, 2012] p. 2, line 25-p. 3, line 35 consisting of 5-pages.

International Search Report and Written Opinion dated Sep. 13, 2013 for International Application No. PCT/IB2013/053332, International Filing Date: Apr. 26, 2013 consisting of 21-pages.

Document for Discussion at 3GPP TSG-RAN WG1 #64, "Aspects_on_Distributed_RRUs_with_Shared_Cell_ID_for_Heterogeneous_Deployments" Source: Ericsson, ST-Ericsson, Agenda Item 6.3.1.2 consisting of 11-pages. Conference held in Taipei, Taiwan (Feb. 21-25, 2011).

* cited by examiner

SHARED CELL RECEIVER FOR UPLINK CAPACITY IMPROVEMENT IN WIRELESS COMMUNICATION NETWORKS

TECHNICAL FIELD

The present invention relates to wireless communications, and in particular to a receiver for a heterogeneous network.

BACKGROUND

The demand for wireless network access and performance has been constantly increasing due in part to the increased popularity of wireless devices. Moreover, as wireless device functionality has increased, so has the quality and performance requirements for wireless data. For example, data intensive video streaming to a mobile device typically involves high quality service requirements such that the user experience is not negatively affected. The result is that wireless data traffic has been increasing almost exponentially while circuit switched traffic has been increasing at a slower pace. While protocols such as long term evolution (LTE) provide higher bandwidth, there is a need to support an increasing number of devices which, in turn, have higher bandwidth requirements.

Wireless network operators have addressed the increased demand for wireless network access and performance in several ways. Some wireless network operators have deployed hierarchical cell structures such as those found in heterogeneous network deployments in order to increase wireless access and performance. Heterogeneous network deployments are configured such that a macro cell coverage area includes one or more pico cells in which the mobile device communicates with the macro cell and/or pico cell(s). For example, wireless network operators can place pico cells at "hot spots" to service specific areas within the macro cell coverage area that typically have a high number of mobile devices.

There are several configurations for heterogeneous deployments including a multi-cell identification (ID) approach and a shared cell ID approach. The multi-cell ID approach includes assigning different cell IDs to each macro cell and pico cell such that each cell is required to transmit different sync, broadcast and mobile device specific control channels. However, a dense deployment of pico cells within a macro cell substantially increases signaling due to frequency handovers for users moving at high speeds.

The shared cell ID approach to heterogeneous networks includes assigning the same cell ID to the macro cell and each pico cell within a macro cell coverage area. The shared cell approach simplifies signaling from the mobile device perspective as the mobile device does not distinguish the macro cell from the pico cell, i.e., the mobile device only "sees" one cell ID while traveling within the macro cell coverage area. Also, the need for additional control signaling overhead associated with hand-offs within the macro cell coverage region is avoided as the mobile device moves between pico cells. The shared cell ID approach also avoids proliferation of cell IDs that occurs in the multi-cell ID approach.

However, the shared cell ID approach is not without faults. For example, a receiver at the macro cell may receive mobile device traffic forwarded from each pico cell. Processing the received traffic can require a substantial amount of resources. For example, the receiver at a macro cell treats the shared cells as a distributed antenna system in which all the link signals of UEs received from the pico cells are summed without regard to the properties of each uplink signal. While data volume scales linearly with each additional uplink signal that is being processed, processing for antenna combining requires a computational complexity that grows exponentially with the number of antennas or received uplink signals. In other words, processing additional uplink signals for antenna combining can rapidly become an issue for limited computational resources. Also, processing all uplink signals received from the pico cells adds noise to the overall received signal, which in turn reduces data throughput. Therefore, current macro cell receivers are unable to take advantage of the different signal information provided by the shared cell approach.

SUMMARY

The present invention advantageously provides a device, system and method for enhancing capacity and performance of the shared cell.

According to one embodiment, a wireless communication system is provided for use in a communication network. The system includes a network device that has a cellular identification (cell ID). The network device forwards an uplink data stream that has uplink data associated with a user device. A base station is in communication with the network device. The base station has the same cell ID as the cell ID of the network device. The base station includes at least one receiver which receives the uplink data stream from the network device. The base station includes a processor configured to determine channel performance data based at least in part on a portion of uplink data stream. The processor is configured to determine whether the channel performance data meets a predetermined performance level and to discard the portion of the uplink data stream when the channel performance data does not meet the predetermined performance level. The processor is configured to tag the portion of the uplink data stream for additional processing when the channel performance data meets the predetermined performance level.

According to another embodiment, a wireless communication method is provided in which an uplink data stream that has uplink data associated with a user device is received. Channel performance data based at least in part on a portion of the uplink data stream is determined. A determination is made whether the channel performance data meets a predetermined performance level. The portion of the uplink data stream is discarded when the channel performance data does not meet the predetermined performance level. The portion of the uplink data stream is tagged for additional processing when the channel performance data meets the predetermined performance level.

According to another embodiment, a wireless communication system is provided that includes a network device that has a cellular identification (cell ID). The network device forwards a data stream having uplink data associated with a user device. A base station in communication with the network device in which the base station has the same cell ID as the cell ID of the network device. The base station includes at least one receiver in which the at least one receiver receives the first data stream. The base station includes a processor. The processor is configured to determine channel performance data based at least in part on a portion of the data stream relayed from a user device to a base station. The processor is configured to determine hearability data in which the hearability data indicates whether the channel performance meets a signal criteria. The processor is configured to schedule resource blocks for the first user device based at least in part on the first hearability data.

BRIEF DESCRIPTION OF THE DRAWINGS

A more complete understanding of the present invention, and the attendant advantages and features thereof, will be

Figure 1:
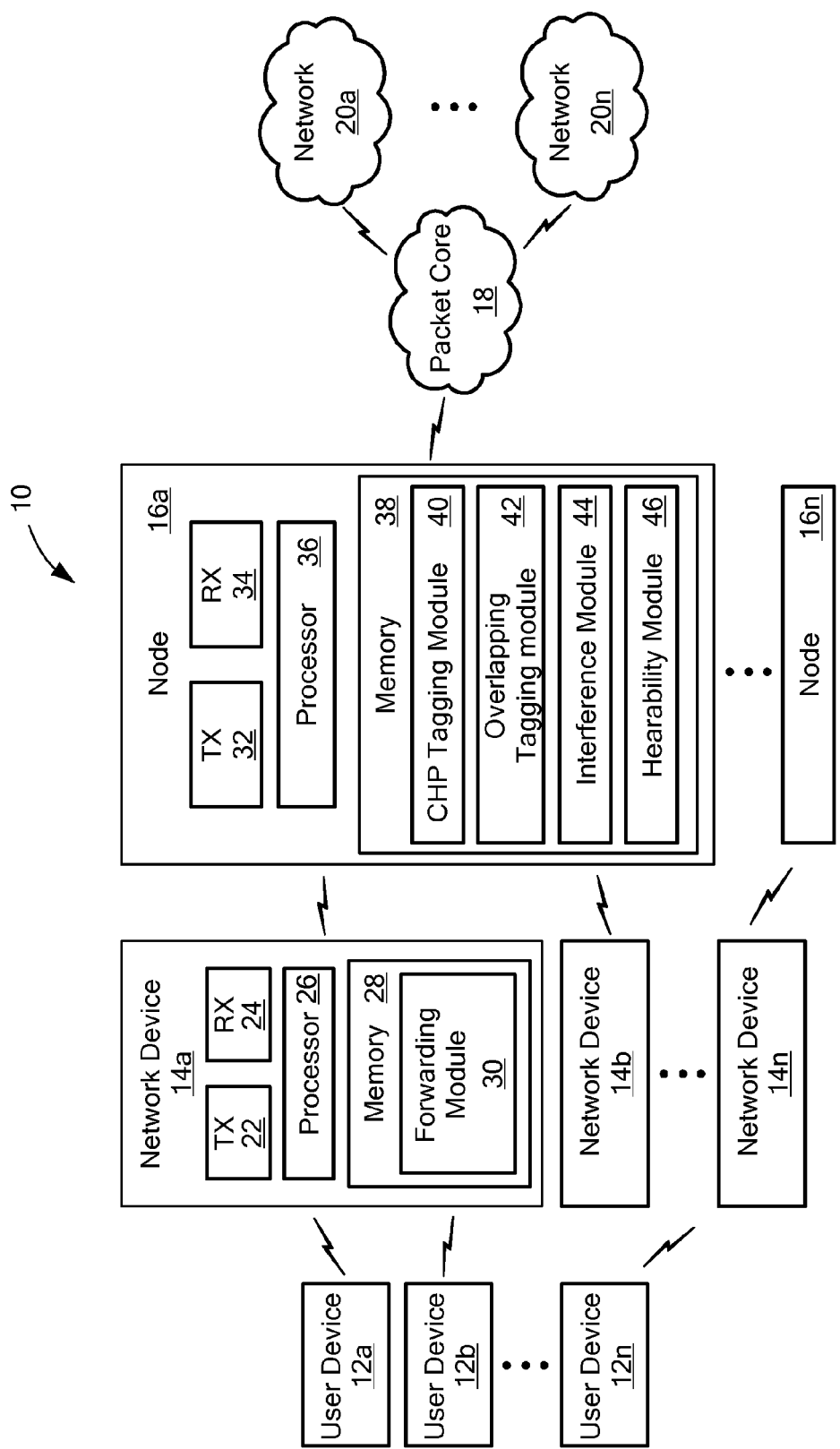
Figure 2:
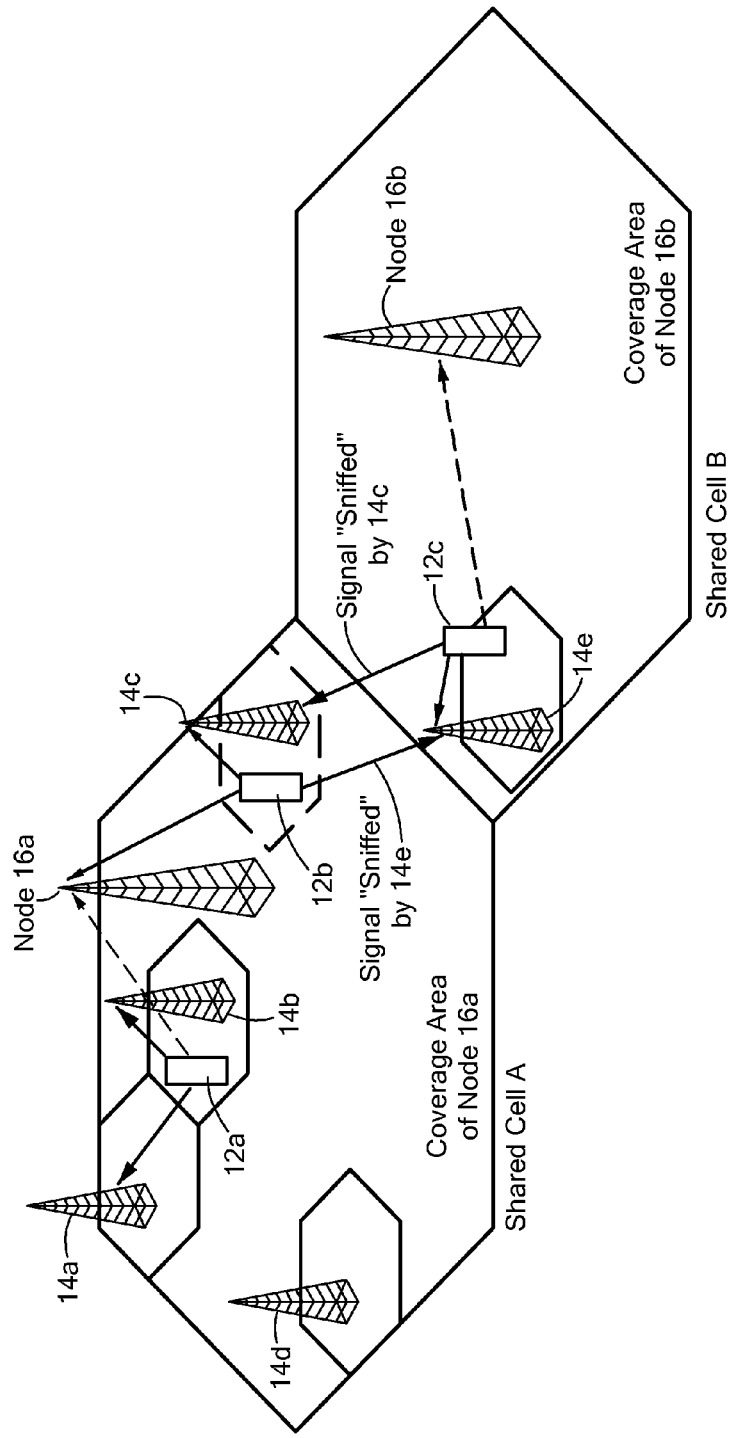
Figure 3:
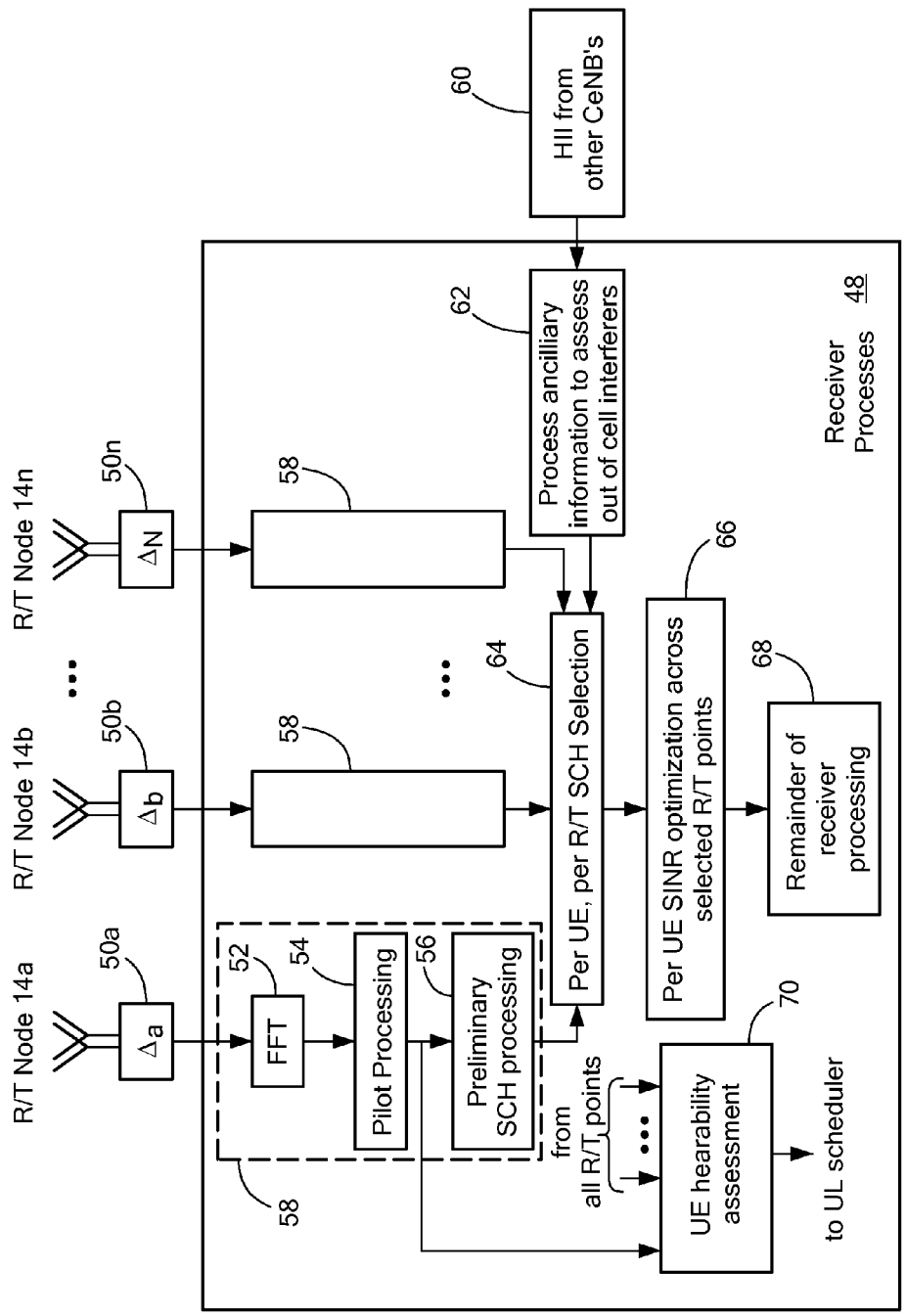
Figure 4:
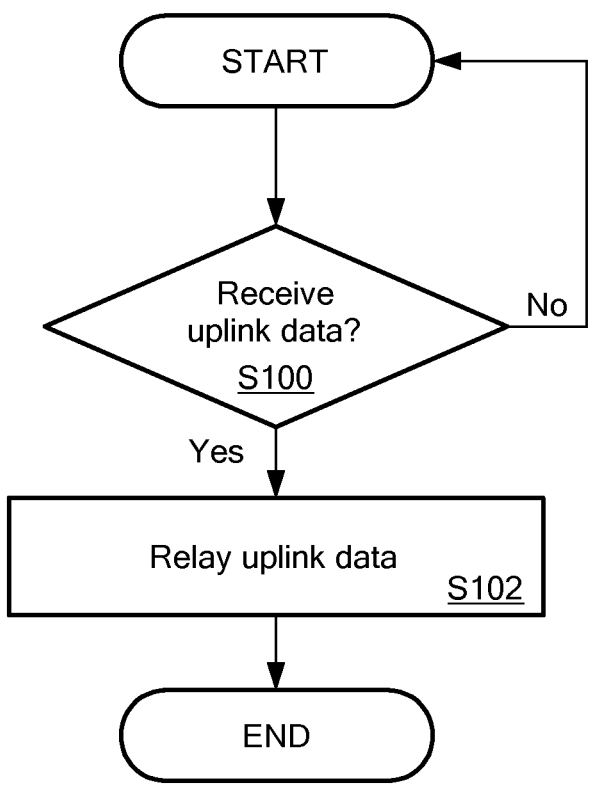
Figure 5:
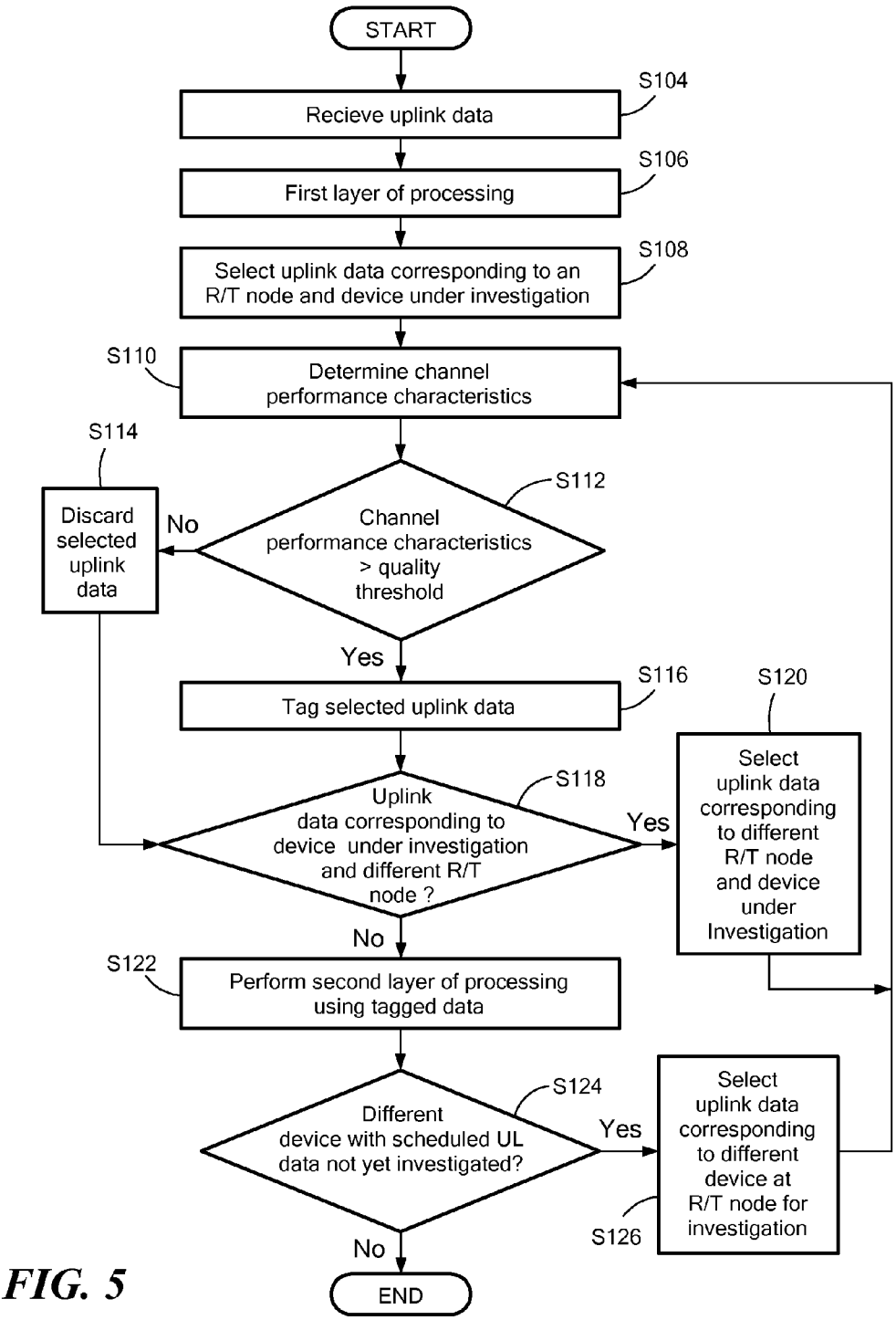
Figure 6:
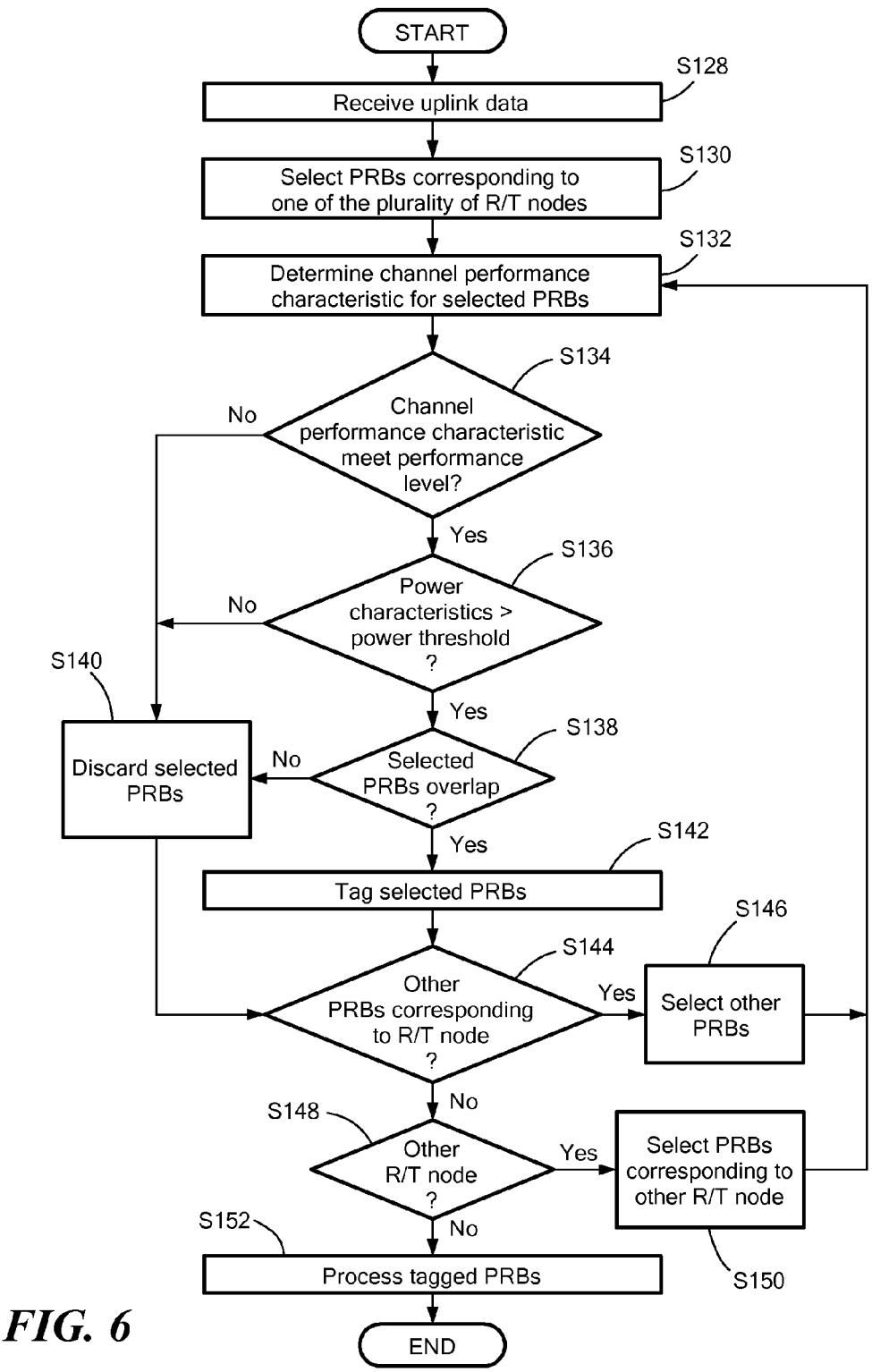
Figure 7:
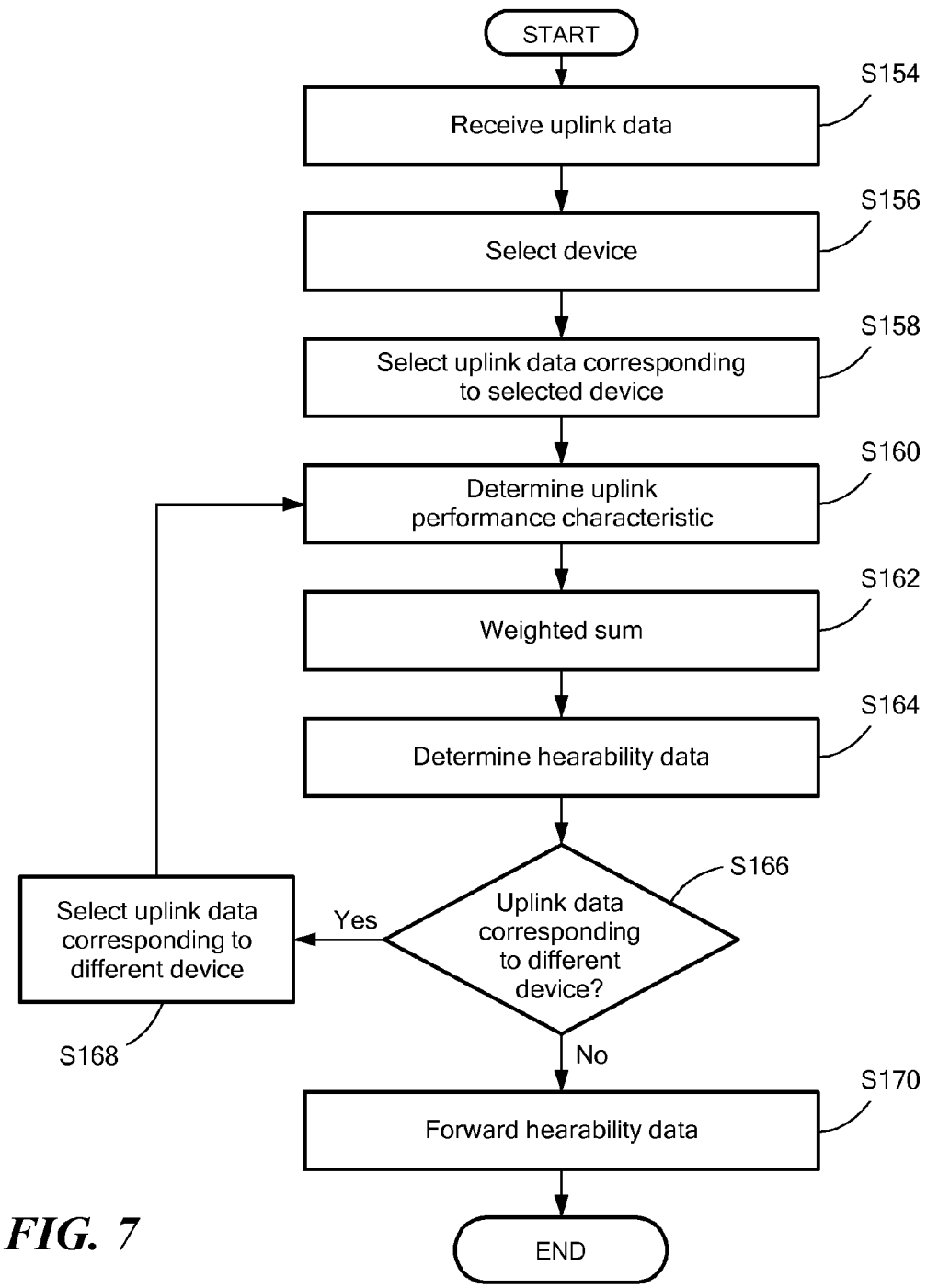

3 more readily understood by reference to the following detailed description when considered in conjunction with the accompanying drawings wherein:

FIG. 1 is block diagram of a communication system using shared cell receivers for receiving uplink data in accordance with the principles of the invention;

FIG. 2 is a block diagram of a plurality of shared cells constructed in accordance with the principles of the invention;

FIG. 3 is a block diagram of an exemplary diagram of receiver processes in accordance with the principles of the invention;

FIG. 4 is flowchart of an exemplary forwarding process in accordance with the principles of the invention;

FIG. 5 is a flowchart of an exemplary process for tagging uplink data in accordance with the principles of the present invention;

FIG. 6 is a flowchart of another exemplary process for tagging uplink data in accordance with the principles of the present invention; and FIG. 7 is a flowchart of an exemplary hearability process in accordance with the principles of the present invention.

DETAILED DESCRIPTION

The present invention advantageously provides a device, system and method capable of improving performance of a macro cell. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Referring now to the drawing figures, in which like reference designators refer to like elements, there is shown in FIG. 1 an exemplary communication system that improves performance of a macro cell in accordance with the principles of the present invention and designated generally as "10." System 10 may include one or more user devices 12a to 12n (collectively referred to as "user device 12"), one or more reception/transmission nodes 14a to 14n (collectively referred to as "R/T node 14"), one or more nodes 16a to 16n (collectively referred to as "node 16"), one or more packet cores 18 (collectively referred to as "packet core 18") and one or more networks 20a to 20n (collectively referred to as "network 20").

User device 12 may include a transmitter, receiver, processor and memory as is known in the art. User device 12 may communicate with R/T node 14 and node 16 via a communications network using communication protocols known in the art, e.g., using Internet Protocols along with LTE standards. User device 12 may communicate with R/T node 14 and node 16 over one or more uplink (UL) channels and/or different UL paths using, for example, long term evolution (LTE) standards, e.g., uplink shared channel (UL-SCH) among other uplink channels known in the art. For example, uplink signals transmitted to node 16 by user device 12 may be "sniffed" by R/T nodes 14 as discussed in detail below with respect to FIG. 4. The communications network may include a wireless communications network. User device 12 may include a mobile device, tablet, laptop, computer, personal digital assistant (PDAs), server, long term evolution (LTE) enabled device and the like.

R/T node 14 may include transmitter 22 and receiver 24 for communicating at least with user device 12 and node 16 using communication protocols known in the art, e.g., using Internet Protocols along with LTE standards. R/T node 14 may include one or more antennas for communicating with user device 12, e.g., main and diversity antennas. R/T node 14 may communicate with node 16 via a common public radio interface (CPRI) line. The CPRI line may include a fiber optic communication link or other high-seed communication link. R/T node 14 may be a remote radio unit (RRU).

R/T node 14 may include processor 26 such as a central processing unit (CPU) for performing node functions described herein. R/T node 14 may include memory 28 that stores forwarding module 30, among other modules. In particular, memory 28 may include non-volatile and volatile memory. For example, non-volatile memory may include a hard drive, flash memory, memory stick and the like. Also, volatile memory may include random access memory and others known in the art. Memory 28 may store program instructions, which when executed, provide the functionality described herein for forwarding module 30. For example, forwarding module 30 includes instructions, which when executed by processor 26, cause processor 26 to perform the forwarding process, discussed in detail below with reference to FIG. 4. R/T node 14 may be a low power remote radio unit providing functionality described herein.

Node 16 may include transmitter 32, receiver 34, processor 36 and memory 38 in communication with each other. In particular, transmitter 32, receiver 34, processor 36 and memory 38 may generally correspond to the components of R/T node 14, with size and performance being adjusted based on design needs, while providing the functionality described herein with respect to node 16. For example, transmitter 32 and receiver 34 may provide transmission and reception of data communications to/from user device 12, R/T node 14 and packet core 18, among other communication devices and servers. For example, node 16 may receive uplink channel signals associated with user device 12 directly from user device 12. Node 16 may also receive uplink channels signals from user device 12 via R/T node 14, i.e., R/T node 14 receives replicas of interference signals or uplink data streams that may be forwarded to node 16 for further processing such as interference cancellation. Each uplink data stream may include respective uplink data or channel signals associated with one or more user devices 12 that may be used for interference estimation. The uplink channel signal may include uplink shared channel (UL-SCH) among other uplink channels in accordance with LTE standards.

Memory 38 includes channel performance (CHP) tagging module 40, overlap tagging module 42, interference module 44 and hearability module 46, among other modules. CHP tagging module 40 tags uplink data received at node 16. For example, CHP tagging module 40 includes program instructions, which when executed by processor 36, cause processor 36 to perform the channel performance tagging process, discussed in detail below with respect to FIG. 5. Overlap tagging module 42 tags uplink data received at node 16. For example, overlap tagging module 42 includes program instructions, which when executed by processor 36, causes processor 36 to perform the overlap tagging process, discussed in detail below with respect to FIG. 6.

Interference module 44 includes program instructions, which when executed by processor 36, cause processor 36 to perform multi-antenna based interference cancellation. The interference cancellation may include maximum ratio combining (MRC), interference rejection combining (IRC), among other multi-beam interference cancellation techniques, as is well known in the art. Replicas of interference signals received from R/T nodes 14 may be used as reference signals for performing interference cancellation. Hearability module 46 includes program instructions, which when executed by processor 36, cause processor 36 to perform the hearability process, discussed in detail below with respect to FIG. 7.

In one embodiment, node 16 is a central base station such as a central eNodeB (CeNodeB) that provides a macro cell coverage area. R/T node 14 may be a base station such as an eNodeB or remote radio unit (RRU) that forwards uplink data received from user device 12 to node 16 as described herein. R/T node 14 has a respective coverage area within the macro cell coverage area in which node 16 transmits signals at a higher power than the R/T node 14, e.g., R/T node 14 is a pico cell. Node 16 and R/T node 14 may be in a shared cell configuration such that both node 16 and R/T node 14 transmit the same cellular specific signals within the macro cell coverage area of node 16, e.g., coordinated multi-point (CoMP) transmission. R/T nodes 14 served by a specific node 16 may have the same cell ID as the specific node 16, i.e., shared cell configuration.

Packet core 18 may be an Internet Protocol (IP) based core network. For example, packet core 18 may be an evolved packet core (EPC) network that is based on end-to-end IP transmission in and out of the EPC network, e.g., all-IP based network. Data and voice may be communicated through EPC via IP packets. Packet core 18 may include server gateways, packet distribution network gateways and mobile management entities (not shown), among other servers and entities as is well known in the art. Network 20 may include communication networks such as wide area networks, local area networks and the like. Network 20 may provide various voice and data related service, content and the like to user device 12 via packet core 18.

An exemplary shared cell configuration constructed in accordance with the principles of the invention is described with reference to FIG. 2. Node 16a has a coverage area that includes R/T node 14a, 14b, 14c and 14d. While four R/T nodes 14 are illustrated within the coverage area of node 16a, one of ordinary skill in the art at the art will understand that the invention is not limited to four R/T nodes 14. Other number of R/T nodes 14 may be implemented within the shared cell coverage area of node 16a. In particular, shared cell A may be configured in a heterogeneous configuration such that node 16a and R/T nodes 14a, 14b, 14c and 14d share the same cellular identification, i.e., LTE shared cell. As a result, user device 12a is unable to distinguish between received transmission signals from R/T node 14b and node 16a as the signals are associated with a single cell ID. R/T nodes 14a, 14b, 14c and 14d may be connected to node 16a via a CPRI communication link (not shown). Several exemplary transmission signals from respective user devices 12 are indicated by arrows in which received signal strength at node 16 and R/T node 14 is indicated by the lines of the arrows, i.e., solid arrows indicate greater received signal strength than the received signal strength of the dashed arrows. Node 16b includes R/T node 14e in which node 16b and R/T node 14e have the same cell ID, i.e., shared cell B.

R/T node 14b has a coverage area that includes user device 12a. For example, user device 12a may be physically located within R/T node 14b coverage area. R/T node 14c has a coverage area that includes user device 12b, e.g., hearability data indicates user device 12a is within communication range of R/T node 14b as discussed below with respect to FIG. 7. Devices 12a and 12b may communicate with R/T nodes 14b and 14c, respectively, and node 16a such that R/T node 14b forwards signals received from user device 12a, i.e., provides "straight forwarding" as discussed below with respect to FIG. 4. Node 16b defines a coverage area located adjacent to node 16a coverage area, i.e., adjacent shared cell. Node 16b may include one or more R/T nodes 14 such as R/T node 14e. R/T node 14e is located within and at the edge of node 16b coverage area. Device 12c is located within the coverage area defined by R/T node 14e such that user device 12c communicates with node 16b and R/T node 14e. Due to the proximity of user device 12b to the edges of node 16a and 16b coverage areas, user device 12b transmission signals may additionally be received at R/T node 14e located within node 16b coverage area and/or received at node 16b. Also, user device 12c transmission signals may additionally be received at R/T node 14c located within node 16a coverage area and/or at node 16a such that R/T node 14c "sniffs" signals from user device 12c associated with shared cell B, as discussed below with respect to FIG. 4.

Furthermore, one or more nodes 16 may be in communication with each other such as to transfer data between each other. For example, node 16a and 16b may communicate high interference indicator (HII) information with each other via a X2 communication link. HII information provides information to neighboring shared cells regarding resource blocks that have been scheduled for use within a macro cell or node 16. For example, node 16b may communicate HII information to node 16a indicating that resource blocks have been scheduled for transmission at R/T points within shared cell B. By indicating scheduled resource blocks within HII, node 16a is able to determine resource blocks that provide useful replicas of interference signals that may be used for interference cancellation, i.e., node 16 is able to determine overlapping resource blocks based at least in part on the HII information.

An exemplary diagram of receiver processing for providing uplink capacity improvement is described with reference to FIG. 3. Receiver processes 48 include receiving a plurality of uplink data streams from R/T nodes 14a-14n via respective communication links, i.e., receives desired UL signals, general interference signals, and replicas of interfering signals from one or more R/T nodes 14. Each communication link may have an associated delay 50a-50n ($\Delta_{a-n}$) that may be compensated for such that the received uplink data streams are synchronized, i.e., receiver processes 48 may include applying a timing offset to each uplink data stream. Processing block 58 may include a Fast Fourier transform (FFT) 52, pilot signal processing 54 and shared channel (SCH) processing 56 on the plurality of uplink data streams. Processing block 58 may be repeated for each R/T node 14. Also, high interference indicators (HIIs) from one or more nodes 16 may be received 60 and processed 62. After SCH processing 56 and HII processing 62, the functionality described herein with respect to tagging module 40 and interference module 44 may be performed, i.e., includes per user device 12 or user equipment (UE) and R/T SCH selection 64 and per UE signal to interference-plus-noise ratio (SINR) optimization 66. Furthermore, after pilot signal processing 54 but before SCH processing 56, the functionality described herein with respect to hearability module 46 may be performed, i.e., UE hearability assessment 70. SCH processing 56 may be performed in the first or second layers of processing.

Hearability data from the UE hearability assessment 70 process may be forwarded to the uplink (UL) scheduler for use in scheduling common resources blocks as described with reference to FIG. 7. After the first layer of processing, the remainder of receiver processing 68 such as a second layer of processing described herein may be performed. In other words, receiver processes 48 provide uplink capacity improvements via one or more modules described herein by exploiting different conditions at each R/T node 14 for each user device 12 while keeping the complexity of processing low.

It is contemplated that the receiver processes 48 can be performed by one or more of receiver 34 and/or processor 36, separately or in combination, and can be based on instantiation of one or more of modules 40, 42, 44 and 46 as described above.

An exemplary process for forwarding uplink data is described with reference to FIG. 4. R/T node 14 determines whether an uplink data stream has been received, e.g., R/T node 14 receives uplink data streams that can be used by node 16 for interference estimation (Step S100). For example, processor 26 may determine that an uplink data stream associated with user device 12 has been received. If no uplink data stream is determined to have been received, the determination of Step S100 may be repeated, i.e., R/T node 14 continues to determine whether uplink data streams or channel signals have been received from user device 12 associated with the same or adjacent macro cell. If R/T node 14 determines that an uplink data stream has been received, the uplink data stream may be forwarded to node 16 via a communications link such as a CPRI communication link (Step S102). For example, uplink data associated with a first user device 12 received at a first R/T node 14 within a first node 16 coverage area may be transmitted to first node 16 via CPRI communication link for processing. Forwarding uplink signals received from user device 12 in the same cell coverage area or shared cell as the R/T node 14 that received with signal is referred to as "straight forwarding" as these signals were intended to be received by R/T node 14. Forwarding uplink signals or discernible replica signals transmitted by user device 12 in an adjacent shared cell from the R/T node 14 that received the signal is referred to as "sniffing" as the discernible replica signal was not intended for R/T node 14 but R/T node 14 sniffed the signal for use in interference estimation.

An exemplary process for tagging uplink data associated with an uplink data stream is described with reference to FIG. 5. Node 16 determines that uplink data has been received from one or more R/T nodes 14 (Step S104). Node 16 may receive uplink data forwarded from each R/T node 14 such as straight forwarded signals. The forwarded uplink data may be received by node 16 at different times due communication link delay such as link delay caused by transmission path length and/or processing delays, among other delays associated with data communications. Node 16 may apply a respective timing offset to compensate for individual link delay caused between R/T node 14 and node 16 such that uplink data received from the plurality of R/T nodes are substantially time aligned with each other.

A first layer of processing may be commenced on the received uplink data (Step S106). The first layer of processing may include preliminary shared channel processing in which a Fast Fourier Transform (FFT) is applied to uplink data received from each R/T node 14. The FFT is applied to each uplink data stream received at node 16 and the pilot signal associated with the physical uplink shared channel (PUSCH) for each stream examined, e.g., first layer of processing does not process the uplink data beyond pilot extraction and analysis. The first layer of processing for each uplink data stream received from a respective R/T node 14 may be processed substantially in parallel. For example, the FFT is performed on each uplink data stream at substantially the same time due in part to the timing offsets applied to one or more uplink streams that synchronize the uplink data streams.

Node 16 selects a portion of uplink data corresponding to a first R/T node 14 and a first user device 12, i.e., node 16 selects user device for investigation and selects a pilot signal associated with user device 12 to examine (Step S108). Node 16 has knowledge of all the uplink data and user devices 12 scheduled within the macro cell such that Node 16 is able to loop through each user device 12 of interest and each R/T point of interest knowing a priori what data to consider or select. Processor 36 determines channel performance characteristic(s) of the selected uplink data, i.e., determined based on the selected pilot signal (Step S110). The channel performance characteristic may include SINR, power level, among other characteristics associated with channel performance.

A determination is made as to whether the channel performance characteristic exceeds a quality threshold (Step S112). The quality threshold may be a predetermined value such as a predetermined signal to interference-plus-noise ratio (SINR) value. For example, processor 36 may determine that the SINR of the selected uplink data, i.e., selected pilot or reference signal ($SINR_{pilot}$), associated with first user device 12 is greater than a minimum SINR value ($SINR_1$). The minimum SINR value indicates a minimum acceptable SINR level associated with uplink data that provides useful information for the second layer of processing without deteriorating the result of the second layer of processing. For example, the first R/T node 14 forwards a "noisy" signal, i.e., uplink data, to node 16 that will add a substantial amount of noise to the net received signal if used in the second layer of processing, i.e., reduces throughput and reduces interference cancellation accuracy. As such, uplink data that does not meet the quality threshold is not used in the second layer of processing.

If the channel performance characteristic is determined to not exceed the predetermined quality threshold, node 16 discards the selected uplink data associated with the channel performance characteristic, i.e., discard the selected portion of the uplink data stream (Step S114). Discarding uplink data indicates the selected uplink data may deteriorate the result of the second layer of processing, e.g., the replica interference signals forwarded from R/T node 14 may deteriorate interference cancellation. Also, discarding uplink data allows receiver 34 to provide low latency processing by reducing the uplink data volume, after initial FFT processing, to a level that is comparable to a receiver for a standard LTE cell. Alternatively or in addition to node 16 performing Steps S106-S114, R/T node 14 may perform the first layer of processing and discarding functions described with respect to Steps S106-S114 such that uplink data is discarded at R/T node 14 based at least in part on channel performance characteristic(s).

If the selected uplink data is discarded, the determination of Step S118, discussed below, is performed. If the channel performance characteristic is determined to exceed the predetermined quality threshold, then the selected uplink data is tagged for further processing, i.e., the selected portion of the uplink data stream is tagged for use during the second layer of processing (Step S116). Tagging the selected uplink data may indicate that the uplink data provides useful information that increases the accuracy of the second layer of processing, e.g., the tagged uplink data provides useful replicas of interference signals that increase the accuracy of interference cancellation.

Node 16 determines whether additional uplink data has not been examined (Step S118). For example, processor 36 determines whether uplink data corresponding to user device 12 under investigation has been received from another R/T node 14, i.e., several R/T nodes 14 may receive and forward uplink data transmitted from user device 12 under investigation by node 16. User device 12 may be within range of two or more R/T nodes 14 in which the R/T nodes 14 will each forward uplink data received from user device 12. As such, receiver 34 may receive uplink data corresponding to user device 12 that is received at plurality of R/T nodes 14.

If the determination is made that uplink data received from another R/T node 14 corresponds to user device 12 under investigation, the corresponding uplink data is selected (Step S120). Specifically, the portion of uplink data corresponding to user device 12 from another R/T node 14 is selected such that Step S110 is repeated with the newly selected portion of uplink data, e.g., channel performance characteristic(s) are determined. If the determination is made that uplink data from another R/T node 14 does not correspond to specific user device 12, processor 36 processes the tagged uplink data, i.e., the tagged uplink data goes through a second layer of processing (Step S122). The tagged uplink data represents a replica of one or more interference signals that can be used in the second layer of processing. The second layer of processing may include multi-antenna processing that is performed based at least in part on tagged uplink data corresponding to user device 12. In particular, interference cancellation may be performed on an uplink data stream received directly from user device 12 using the tagged uplink data as reference interference signals. The reference interference signals improve the performance of interference cancellation, thereby increasing data throughput. The multi-antenna processing may include maximum ratio combining (MRC), interference rejection combining (IRC), among other multi-antenna or multi-beam processing techniques.

The first and second layers of processing performed on the uplink data allow the system to provide increased performance and uplink channel capacity while keeping the processing complexity at receiver 34 to a minimum. For example, specific user device 12 may transmit uplink data that is received at four R/T nodes 14 in which node 16 receives four individual uplink data streams each having uplink data associated with specific user device 12. Out of the four streams of uplink data, only two streams may have a signal quality sufficient to pass the first layer of processing, i.e., $SINR_{pilot}$ is greater than $SINR_1$. Therefore, two of the streams will be discarded. The first level of processing provides significant data volume reduction by discarding uplink data not meeting the quality threshold. The first level of processing also provides SINR improvements by preventing low SINR signals from being included in the second layer of processing, i.e., low SINR signals may reduce the overall SINR of the uplink data to be processed via the second layer of processing. The first layer of processing may be performed by R/T nodes 14 and/or node 16. For example, the first layer of processing may be performed at one or more R/T nodes 14 such that one or more streams of uplink data are discarded by the R/T nodes 14, i.e., are not forwarded to node 16, such that backhaul capacity requirements are reduced.

Moreover, the second layer of processing provides interference cancellation based on tagged uplink data. Performing interference cancellation using tagged uplink data and not discarded uplink data increases the performance of the interference cancellation. Discarding uplink data reduces the processing complexity at node 16 while still providing improved performance because the amount of uplink data streams to be processed by the second layer of processing is reduced such that the processing complexity of multi-beam processing is reduced.

Once all of the uplink data or returns from a given user device 12 have been considered and processed across all R/T nodes 14 in the macro cell, a determination is made as to whether there are other user devices 12 within this macro cell that have uplink data scheduled in the subframe, e.g., whether a different device with scheduled uplink data has yet to be investigated by node 16 (Step S124). If it is determined that a different user device 12 has associated uplink data across R/T nodes 14 within node 16, the portion of the uplink data stream, i.e., PRBs, are selected for investigation (Step S126), and the process of tagging data for the different user device across R/T nodes 14 is repeated for the newly selected PRBs.

An exemplary process for tagging overlapping uplink data is described with reference to FIG. 6. Processor 36 determines that uplink data has been received from a plurality of R/T nodes 14 (Step S128). For example, processor 36 determines receiver 34 has received individual uplink data streams or sniffed signals from a plurality of R/T nodes 14. Node 16 selects physical resource blocks (PRBs) corresponding to one of the plurality of R/T nodes 14 (Step S130). An individual uplink data stream from R/T node 14 may contain a plurality of PRBs in which one set of PRBs is selected for processing. A channel performance characteristic(s) corresponding to the selected PRBs is determined (Step S132). For example, the channel performance characteristic may include SINR ($SINR_{PRB}$), power level, among other characteristics associated with channel performance. A determination is made whether the channel performance characteristic meets a predetermined channel performance level, e.g., whether $SINR_{PRB}$ is less than a predetermined performance level ($SINR_2$) (Step S134). The required performance level should be met to provide an accurate reference to estimate the interference signal, i.e., $SINR_{PRB} < SINR_2$.

If the determination is made that the channel performance characteristic is less than the predetermined performance level, a determination is made as to whether a signal power characteristic is greater than a predetermined power threshold, i.e., whether a second channel performance characteristic is greater than a second performance level (Step S136). For example, node 16 determines whether the power level associated with the selected PRBs is greater than the predetermined power threshold, i.e., $P_{PRB}$ greater than $P_{threshold}$. The predetermined power threshold may indicate a minimum power needed to provide an interference reference signal that will not reduce the accuracy of interference cancellation.

If the determination is made that the signal power characteristic is greater than a predetermined power threshold, a determination is made as to whether the selected PRBs overlap with other PRBs scheduled for use by another user device 12 at another R/T node 14 served by a different node 16 (Step S138). For example, PRBs corresponding to first user device 12 communicating with first R/T node 14 served by first Node 16 may overlap with PRBs corresponding to another user device 12 in communication with another R/T node 14 served by a different node 16, i.e., served by a different macro cell. The overlap corresponds to user devices in different macro cells, i.e., node 16a and node 16b. The overlap determination of Step S138 may be based at least in part on HII information received from adjacent macro cells, i.e., HII information indicates PRBs scheduled at adjacent node 16.

If the determination is made that the PRBs do not overlap, the selected PRBs are discarded (Step S140). Discarding PRBs indicates that the characteristics of the selected PRBs do not provide useful interference reference signals for interference cancellation, i.e., the selected PRBs may add noise and/or reduce accuracy. After discarding the selected PRBs, a determination is made as to whether there are any PRBs that have not been examined (Step S144). For example, the uplink data associated with a specific R/T node 14 may include a plurality of PRBs, each of which are selected for processing.

If the determination is made that PRBs have not been examined, node 16 selects another set of PRBs (Step S146). The selected PRBs are processed as discussed above with respect to Step S132. If the determination is made that all PRBs associated with an uplink data stream from specific R/T node 14 have been examined, a determination is made as to whether PRBs associated with another R/T node 14 has not be examined (Step S148). If node 16 determines that uplink data associated with another R/T node 14 have not been examined, PRBs associated with the unexamined uplink data are selected, i.e., processor 36 selects uplink data associated with another R/T node 14 (Step S150). The selected PRBs are processed as discussed above with respect Step S132.

Referring back to Step S138, if the determination is made that the selected PRBs overlap with other PRBs in use by another user device 12 at a different R/T node 14 service by a different macro cell, the selected PRBs are tagged for further processing (Step S142). For example, tagging PRBs indicates that the tagged PRBs may provide useful interference reference signals for use in the second layer of processing. After tagging PRBs, the determination of Step S144 may be repeated. Referring back to Step S148, if the determination is made that all PRBs associated with received uplink data have been examined across all R/T nodes 14 within a given node 16 or macro cell, the tagged PRBs are provided to the interference processor 44 of node 16 for that macro cell. For example, interference cancellation is performed based at least in part on the tagged PRBs available through the R/T nodes' sniffed signals or receipt of UL signals from user devices 12 in adjacent macro cells. The tagged PRBs represent a replica of one or more interfering signals forwarded from R/T node 14 within the macro cell that may be used for the second layer of processing, e.g., interference cancellation.

An exemplary process for scheduling RBs is described with reference to FIG. 7. In particular, node 16 determines whether at least two user devices 12 have complimentary hearability across at least two R/T nodes 14. Node 16 determines uplink data has been received from R/T nodes 14, e.g., receives straight forwarded signals (Step S154). For example, processor 36 determines uplink data has been received from respective R/T nodes 14 via a CPRI communication link. Node 16 selects first user device 12 having associated uplink data for processing (Step S156).

Uplink data received from each R/T node 14 that is associated with first user device 12 is selected (Step S158). For example, the pilot signal or reference signal of any of the uplink channels such as shared channel (SCH), physical uplink control channel (PUCCH), sounding reference signal (SRS) and random access channel (RACH), among other uplink channels according to LTE standards may be selected for processing. The terms "first" and "second" are used herein to indicate a specific user device 12 and/or R/T node 14. An uplink performance characteristic associated with the selected uplink data is determined (Step S160). The uplink performance characteristic may include SINR, power level, among other signal characteristics associated with channel performance. The channel performance characteristics of each individual uplink data stream associated with first user device 12 is determined. For example, the uplink performance characteristics of a first uplink data stream from R/T node 14 and a second uplink data stream from another R/T node 14 are determined in which both first and second uplink data streams are associated with first user device 12.

The weighted sum of channel performance characteristics is determined (Step S162). The weighted sum of channel performance characteristics indicates the SINR contribution associated with first user device 12 for one or more uplink channels such SCH, PUCCH, SRS and RACH, among other uplinks channels in accordance with LTE standards. Hearability data is determined (Step S164). In particular, hearability data may be determined based at least in part on the weighted sum of channel performance characteristics associated with first user device 12. For example, the weighted sum of SINR values may be filtered based on a memory time constant to generate filter values in which the filter values are compared to predetermined hearability thresholds to determine whether the first user device 12 is "within" or "outside" the communication range of R/T node 14.

In other words, hearability data indicates whether first user device 12 is within the communication range or outside the communication range of a specific R/T node 14, i.e., indicates whether a signal received at R/T node 14 from specific user device 12 meets a predetermined signal quality indicating user device 12 is within or outside the communication range of R/T node 14. The weighted sum of channel performance characteristics may be averaged over several radio subframes to increase accuracy and reliability of the weighted sum in which a memory constant may be used to weigh the most recent measurements as being more valuable. If no uplink data is associated with user device 12 during one of the iteration of determining the weighed SINR contribution, i.e., no uplink channel is present for first user device 12, node 16 may interpolate between the last SINR contribution and the next SINR contribution to determine the missing SINR contribution.

A determination is made as to whether the uplink data corresponds to a different user device 12, i.e., whether additional uplink data needs to be examined (Step S166). If the determination is made that uplink data corresponds to a different user device 12, the uplink data corresponding to the different user device 12 is selected, i.e., a portion of the uplink data stream is selected (Step S168). The processing of Step S160, as discussed above, is performed for the selected uplink data. If the determination is made that the uplink data does not correspond to a different user device 12, hearability data may be forwarded to an uplink scheduler such that the uplink scheduler schedules resource blocks based at least in part on the hearability data. Resource blocks can be scheduled based on the determined hearability data such that different user devices 12 communicating with respective R/T nodes 14 within a node 16 or macro cell coverage area are scheduled distinct or common resource blocks.

For example, hearability data associated with first user device 12 may indicate that the first user device 12 is not hearable or within the communication range at first R/T node 14 but is hearable at second R/T node 14. The coverage area of the second R/T node, e.g., pico cell, includes first user device 12 while first R/T node 14 coverage area does not include first device, i.e., the received signal from first user device 12 at first R/T node 14 is too deteriorated or weak. The hearability data associated with a second user device 12 may indicate that second user device 12 is hearable at first R/T node 14 but not hearable at second R/T node 14. In other words, the coverage area of first R/T node, i.e., pico cell, includes second user device 12 while the coverage area of second R/T node 14 does not include second device 14, i.e., the received signal from second user device 12 at second R/T node 14 is too deteriorated or weak.

Based on the hearability data, the uplink scheduler may schedule resources common with both first user devices 12 and second user device 12, i.e., schedules on common resource blocks (RBs) to different user devices 12 served by the same macro cell or node 16. Referring to FIG. 2, user device 12a and user device 12b may be scheduled common resource blocks based at least in part on determined hearability data, i.e., the scheduler may assign PRBs that can be re-used between user devices 12a and 12b across R/T nodes 14 served by node 16a. First and second user devices 12 may use common resources that do not substantially interfere with each other. Scheduling at least two user devices 12 on common or corresponding resources within a macro cell increases the amount of user devices 12 that can serviced within a macro cell while positively impacting aggregate data throughput.

Moreover, node 16 may provide the same downlink signals to all R/T nodes 14 such that complementary user devices 12 must be scheduled on distinct downlink channels. The uplink hybrid automatic repeat request (HARQ) on the physical HARQ indicator channel (PHICH) may be distinguished between complementary user devices 12. For example, the different reference signals phase rotations may be specified in the uplink grant. Alternatively, the complementary user devices 12 may be scheduled different physical uplink shared channel (PUSCH) PRB start points.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A wireless communication system, comprising:
a first network device having a cellular identification, cell ID, the first network device forwarding a first uplink data stream having first uplink data associated with a user device; and
a base station in communication with the first network device, the base station having the same cell ID as the cell ID of the first network device, the base station including:
  at least one receiver, the at least one receiver receiving the first uplink data stream from the first network device; and
  a processor, the processor configured to:
    determine channel performance data based at least in part on a portion of first uplink data stream;
    determine whether the channel performance data meets a predetermined performance level;
    discard the portion of the first uplink data stream when the channel performance data does not meet the predetermined performance level; and
    tag the portion of the first uplink data stream for additional processing when the channel performance data meets the predetermined performance level.

2. The system of claim 1, wherein the additional processing includes performing interference cancellation based at least in part on the tagged portion of the first uplink data stream.

3. The system of claim 2, wherein the portion of first uplink data stream is a reference signal in an uplink shared channel, UL-SCH.

4. The system of claim 2, further comprising a second network device, the second network device forwarding a second uplink data stream having the first uplink data associated with the user device, the second network device having the same cell ID as the base station, the at least one receiver receiving the second uplink data stream; and
the base station processor further configured to:
  determine second channel performance data based at least in part on a portion of second uplink data stream;
  determine whether the second channel performance data meets the predetermined performance level;
  disregard the portion of the second uplink data stream when the second channel performance data does not meet the predetermined performance level; and
  tag the portion of the second uplink data stream for the additional processing when the second channel performance data meets the predetermined performance level, the interference cancellation is based at least in part on the tagged portion of the second uplink data stream.

5. The system of claim 2, wherein the first uplink data stream includes second uplink data associated with a second user device, the second user device being associated with a second base station having a different cell ID than the cell ID of the first base station; and
the interference cancellation is based at least in part on a portion of the second uplink data stream.

6. The system of claim 5, wherein the portion of the first uplink data stream is a physical resource block, PRB.

7. The system of claim 6, wherein the predetermined performance level includes a maximum signal to interference plus noise ratio, SINR, and minimum power level.

8. The system of claim 6, wherein the PRB overlaps with another PRB scheduled for use by another user device associated with the second base station.

9. A wireless communication method, comprising:
receiving a first uplink data stream having uplink data associated with a user device;
determining channel performance data based at least in part on a portion of the first uplink data stream;
determining whether the channel performance data meets a predetermined performance level;
discarding the portion of the first uplink data stream when the channel performance data does not meet the predetermined performance level; and
tagging the portion of the first uplink data stream for additional processing when the channel performance data meets the predetermined performance level.

10. The method of claim 9, wherein the additional processing includes performing interference cancellation based at least in part on the tagged portion of the first uplink data stream.

11. The method of claim 10, wherein the portion of the first uplink data stream is a reference signal in an uplink shared channel, UL-SCH.

12. The method of claim 10, further comprising:
receiving a second uplink data stream having the uplink data associated with the user device;
determining second channel performance data based at least in part on a portion of the second uplink data stream;
determining whether the second channel performance data meets the predetermined performance level;
discarding the portion of the second uplink data stream when the second channel performance data does not meet the predetermined performance level;
tagging the portion of the received second uplink data stream for additional processing when the second channel performance data meets the predetermined performance level; and
the interference cancellation being based at least in part on the tagged portion of the second uplink data stream.

13. The method of claim 10, wherein the user device is associated with a first base station having a cell ID; and
the method further comprising receiving a second uplink data stream associated with a second user device, the second user device being associated with a second base station having a different cell ID than the cell ID of the first base station; and
the interference cancellation is based at least in part on a portion of the second uplink data stream.

14. The method of claim 13, wherein the portion of the first uplink data stream is a physical resource block, PRB.

15. The method of claim 14, wherein the PRB overlaps with another PRB scheduled for use by another user device associated with the second base station.

16. The method of claim 13, wherein the predetermined performance level includes a maximum signal to interference plus noise ratio, SINR, and minimum power level.

17. A wireless communication system, the system comprising:
a first network device having a cellular identification, cell ID, the first network device forwarding a first data stream having uplink data associated with a first user device;
a base station in communication with the first network device, the base station having the same cell ID as the cell ID of the first network device, the base station including:
at least one receiver, the at least one receiver receiving the first data stream;
a processor, the processor configured to:
determine first channel performance data based at least in part on a portion of the first data stream relayed from a user device to the base station;
determine first hearability data, the first hearability data indicating whether the first channel performance meets a signal criteria; the first hearability data being determined based at least in part on a weighted sum of first channel performance data associated with the first user device and
schedule resource blocks for the first user device based at least in part on the first hearability data.

18. The system of claim 17, further comprising a second network device, the second network device forwarding a second data stream having uplink data associated with a second user device;
the at least one receiver receiving the second data stream;
the processor is further configured to:
determine second channel performance data based at least in part on a portion of the second data stream;
determine second hearability data, the second hearability data indicating whether the second channel performance meets the signal criteria, the scheduling of the resource blocks includes scheduling the second user device based at least in part on the first and second hearability data.

19. The system of claim 18, wherein the first user device and second user device are scheduled on common resource blocks.

20. The system of claim 18, wherein the second network device has the same cell ID as the cell ID of the base station.

* * * * *

UNITED STATES PATENT AND TRADEMARK OFFICE
CERTIFICATE OF CORRECTION

| | |
|---|---|
| PATENT NO. | : 8,942,251 B2 |
| APPLICATION NO. | : 13/473956 |
| DATED | : January 27, 2015 |
| INVENTOR(S) | : Lightstone et al. |

It is certified that error appears in the above-identified patent and that said Letters Patent is hereby corrected as shown below:

In the Claims

In Column 14, Line 40, in Claim 5, delete "the first" and insert -- the --, therefor.

In Column 16, Line 16, in Claim 17, delete "and" and insert -- ; and --, therefor.

Signed and Sealed this
Twenty-eighth Day of July, 2015

Michelle K. Lee
*Director of the United States Patent and Trademark Office*